United States Patent
Yamamoto et al.

(10) Patent No.: US 11,404,195 B2
(45) Date of Patent: Aug. 2, 2022

(54) REACTOR

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Shinichiro Yamamoto, Mie (JP); Takashi Misaki, Mie (JP); Seiji Shitama, Mie (JP); Tatsuo Hirabayashi, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 411 days.

(21) Appl. No.: 16/480,154

(22) PCT Filed: Jan. 22, 2018

(86) PCT No.: PCT/JP2018/001835
§ 371 (c)(1),
(2) Date: Jul. 23, 2019

(87) PCT Pub. No.: WO2018/147062
PCT Pub. Date: Aug. 16, 2018

(65) Prior Publication Data
US 2019/0385776 A1     Dec. 19, 2019

(30) Foreign Application Priority Data

Feb. 8, 2017    (JP) .............................. JP2017-021005
Oct. 12, 2017    (JP) .............................. JP2017-198859

(51) Int. Cl.
*H01F 27/40*         (2006.01)
*H01F 27/10*         (2006.01)
(Continued)

(52) U.S. Cl.
CPC ............... *H01F 27/10* (2013.01); *G01K 7/02* (2013.01); *H01F 27/24* (2013.01); *H01F 27/2876* (2013.01)

(58) Field of Classification Search
CPC ...... H01F 27/10; H01F 27/24; H01F 27/2876; H01F 27/266; H01F 2027/406; H01F 27/402; H01F 37/00; G01K 7/02
See application file for complete search history.

(56) References Cited

U.S. PATENT DOCUMENTS 4,112,405 A * 9/1978 Joseph .................. H01F 27/402
                                                         310/680
6,326,879 B1 * 12/2001 Hangmann .......... H01H 37/043
                                                         310/68 C (Continued)

FOREIGN PATENT DOCUMENTS

| JP | 2016-092200 A | 5/2016 |
|---|---|---|
| JP | 2016-157857 A | 9/2016 |
| WO | 2016-060001 A1 | 4/2016 |

OTHER PUBLICATIONS

International Search Report, Application No. PCT/JP2018/001835, dated Apr. 24, 2018. ISA/Japan Patent Office.

*Primary Examiner* — Mang Tin Bik Lian
(74) *Attorney, Agent, or Firm* — Honigman LLP

(57) ABSTRACT

Provided is a reactor that includes: a coil provided with a wound portion that is obtained by winding a winding wire, and has an exposed region with which a liquid coolant comes into direct contact; a magnetic core that is arranged inside and outside the wound portion, and forms a closed magnetic circuit; a sensor member configured to measure the temperature of the coil, the sensor member including a rod-shaped sensor body portion attached to the exposed region of the wound portion, and a wire coupled to the sensor body portion; and a sensor cover portion that covers (Continued)

surfaces of the outer periphery of the sensor body portion, except for a mounting surface for mounting to the wound portion and at least part of a coupling surface to which the wire is coupled.

9 Claims, 5 Drawing Sheets

(51) Int. Cl.
    *G01K 7/02*         (2021.01)
    *H01F 27/24*      (2006.01)
    *H01F 27/28*      (2006.01)

(56) References Cited

U.S. PATENT DOCUMENTS

| | | | |
|---|---|---|---|
| 6,842,100 B1* | 1/2005 | Kim | H01F 27/327 |
| | | | 336/198 |
| 9,608,499 B2* | 3/2017 | Bessho | H02K 3/522 |
| 2004/0145437 A1* | 7/2004 | Lee | H01F 27/402 |
| | | | 336/55 |
| 2014/0292456 A1* | 10/2014 | Suzuki | H01F 27/263 |
| | | | 336/55 |
| 2015/0179329 A1* | 6/2015 | Miyamoto | H02M 1/12 |
| | | | 323/214 |
| 2015/0365015 A1* | 12/2015 | Ito | H01F 37/00 |
| | | | 363/131 |
| 2016/0125996 A1* | 5/2016 | Ko | H01F 27/08 |
| | | | 336/60 |
| 2016/0314897 A1* | 10/2016 | Misaki | H01F 27/2823 |
| 2016/0322150 A1 | 11/2016 | Inaba et al. | |
| 2017/0370781 A1* | 12/2017 | Yoshihara | G01K 1/143 |

\* cited by examiner

REACTOR

CROSS-REFERENCE TO RELATED APPLICATIONS

This application is the U.S. national stage of PCT/JP2018/001835 filed on Jan. 22, 2018, which claims priority of Japanese Patent Application No. JP 2017-021005 filed on Feb. 8, 2017, and Japanese Patent Application No. JP 2017-198859 filed Oct. 12, 2017, the contents of which are incorporated herein.

TECHNICAL FIELD

The present disclosure relates to a reactor.

BACKGROUND

A reactor is one of constituent components of circuits for performing voltage step-up and step-down operations. For example, JP 2016-92200A discloses a reactor provided with a coil having a wound portion obtained by winding a winding wire, a magnetic core partially arranged inside the wound portion, a sensor member for measuring the temperature of the coil, a casing in which an assembly of the coil and the magnetic core is accommodated, a sealing resin with which the casing is filled, and a lid plate arranged on the open side of the casing. In this reactor, the lid plate is provided with a sensor supporting portion for supporting the sensor member so that the sensor member is arranged at a predetermined position on the coil.

It is desirable to reduce an increase in the temperature of a coil, and accurately measure the temperature of the coil.

When a reactor is operated, a coil generates heat and the temperature thereof increases, and thus it is proposed to perform forced cooling using a liquid coolant. In this case, it is conceivable that, if the coil is exposed without being covered with the sealing resin disclosed in JP 2016-92200A so that the liquid coolant comes into direct contact with the coil, heat dissipation performance will be enhanced, and the increase in the temperature of the coil will be easily reduced. Furthermore, it is also conceivable that, by arranging the sensor member in the exposed region of the coil, it is possible to easily and appropriately measure the temperature of the coil.

However, if the sensor member is arranged in the exposed region of the coil, there may be a risk that the liquid coolant will come into contact with the sensor member as well. If the liquid coolant comes into contact with the sensor, there may be a risk that the sensor will be affected by the liquid coolant and cannot appropriately measure the temperature of the coil.

Therefore, it is an object of the present disclosure to provide a reactor that can reduce an increase in the temperature of a coil, and can accurately measure the temperature of the coil.

SUMMARY

According to the present disclosure, a reactor includes: a coil provided with a wound portion that is obtained by winding a winding wire, and has an exposed region with which a liquid coolant comes into direct contact; a magnetic core that is arranged inside and outside the wound portion, and forms a closed magnetic circuit; a sensor member configured to measure a temperature of the coil, the sensor member including a rod-shaped sensor body portion attached to the exposed region of the wound portion, and a wire coupled to the sensor body portion; and a sensor cover portion that covers surfaces of an outer periphery of the sensor body portion, except for a mounting surface for mounting to the wound portion and at least part of a coupling surface to which the wire is coupled.

Advantageous Effects of Present Disclosure

According to the present disclosure, it is possible to provide a reactor that can reduce an increase in the temperature of a coil, and can accurately measure the temperature of the coil.

DETAILED DESCRIPTION OF PREFERRED EMBODIMENTS

Figure 1:
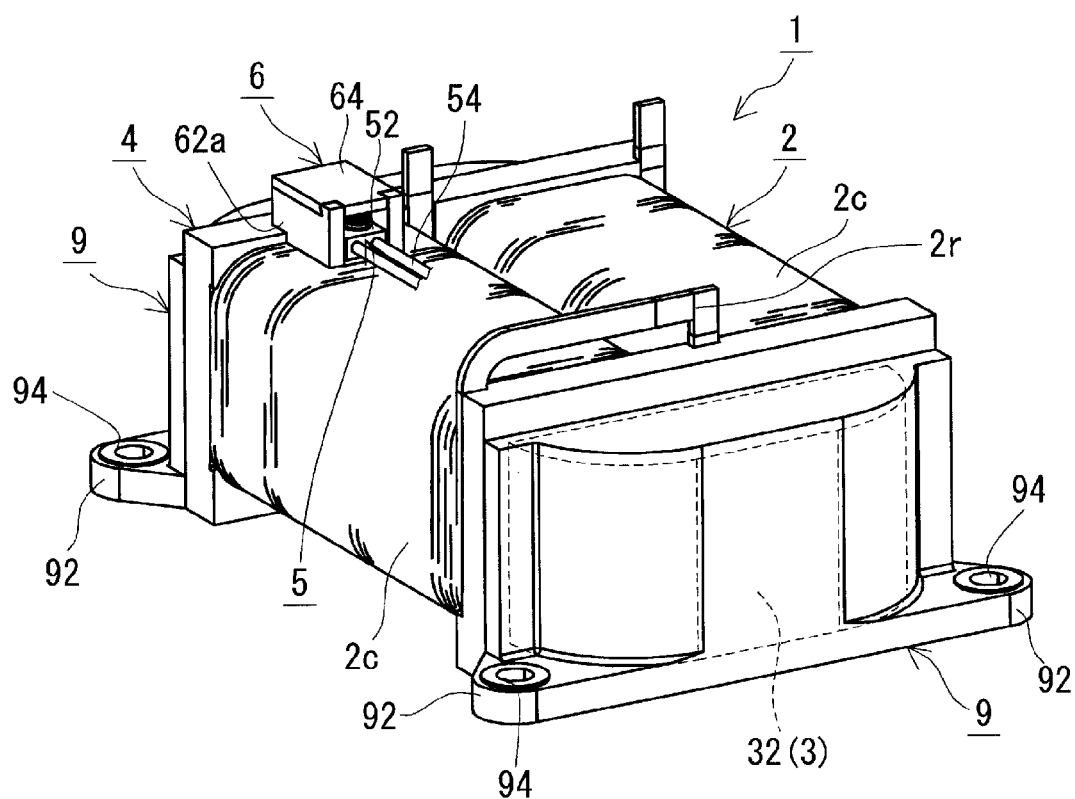
FIG. 1 is a perspective view schematically illustrating a reactor according to Embodiment 1.

First, embodiments of the present disclosure will be described sequentially.

According to an aspect of the present disclosure, a reactor includes: a coil provided with a wound portion that is obtained by winding a winding wire, and has an exposed region with which a liquid coolant comes into direct contact; a magnetic core that is arranged inside and outside the wound portion, and forms a closed magnetic circuit; a sensor member configured to measure a temperature of the coil, the sensor member including a rod-shaped sensor body portion attached to the exposed region of the wound portion, and a wire coupled to the sensor body portion; and a sensor cover portion that covers surfaces of an outer periphery of the sensor body portion, except for a mounting surface for mounting to the wound portion and at least part of a coupling surface to which the wire is coupled.

In the above-described reactor, a liquid coolant can be brought into direct contact with the wound portion in the exposed region of the wound portion. Accordingly, in a state of use in which the liquid coolant is supplied to the wound portion as needed when the reactor is operated, even if the coil generates heat and the temperature thereof increases, it is possible to efficiently reduce the increase in the temperature of the coil using the liquid coolant. Furthermore, in the above-described reactor, the surfaces of the outer periphery of the sensor body portion, except for the mounting surface and at least part of the coupling surface, are covered by the sensor cover portion, and thus it is possible to suppress the liquid coolant supplied to the wound portion from coming into contact with the sensor body portion. Accordingly, the sensor body portion can appropriately and accurately measure the temperature of the wound portion (coil), substantially without being affected by the liquid coolant.

As a configuration of the reactor, an end-face interposed member may further be provided, the end-face interposed member being interposed between an outer-side core portion of the magnetic core that is arranged outside the wound portion, and an end face of the wound portion, wherein the sensor cover portion includes: a wall portion that is integrated with the end-face interposed member, and covers, of the outer periphery of the sensor body portion, an intersecting surface that extends in a direction that intersects the mounting surface; and a lid portion that is provided separately from the wall portion, and covers, of the outer periphery of the sensor body portion, an opposite surface that is opposite to the mounting surface.

As a result of one part (wall portion) of the sensor cover portion being integrated with the end-face interposed member, which is a constituent component of the reactor, the wall portion is arranged on the wound portion by assembling together the coil, the magnetic core, and the end-face interposed member at the time of assembling the reactor. The wall portion is a portion that covers, of the outer periphery of the sensor body portion, the intersecting surface that extends in a direction that intersect the mounting surface for mounting to the wound portion. Accordingly, when the wall portion is arranged on the wound portion, an arrangement space for arrangement of the sensor body portion will be formed by the wound portion and the wall portion. Also, as a result of another part (lid portion) of the sensor cover portion being provided separately from the wall portion, it is easy to arrange the sensor body portion in the arrangement space for arrangement of the sensor body portion, which is formed by the wound portion and the wall portion, and thus, only by arranging the lid portion after having arranged the sensor body portion, the sensor body portion can be covered by the wall portion and the lid portion. As described above, since the wall portion is provided on the end-face interposed member, and the lid portion and the wall portion are provided separately from each other, it is easy to arrange the sensor member and the sensor cover portion at predetermined positions, and the reactor has superior assembly property.

As a configuration of the above-described reactor including the sensor cover portion with the lid portion, an elastic member may further be provided, the elastic member being interposed between the lid portion and the sensor body portion, and pressing the sensor body portion toward the wound portion.

As a result of the elastic member being provided between the lid portion and the sensor body portion, the elastic member presses the sensor body portion toward the wound portion, so that it is easy to closely attach the sensor body portion to the wound portion.

As a configuration of the above-described reactor with the elastic member, the elastic member may be a coil spring or a flat spring.

A coil spring or a flat spring is easily available, and with a simple configuration, it is possible to efficiently attach the sensor body portion closely to the wound portion side.

As a configuration of the above-described reactor including the sensor cover portion with the wall portion and the lid portion, the wall portion and the lid portion may have a snap-fit structure with which they are fitted to each other.

As a result of the snap-fit structure being used to fit the wall portion and the lid portion to each other, it is possible to efficiently prevent the lid portion from being removed from the wall portion.

As a configuration of the above-described reactor, the sensor cover portion may include a removal preventing portion that covers a region of the coupling surface, except for a portion from which the wire is drawn, the removal preventing portion preventing the sensor body portion from being removed.

Since the wire is coupled to the sensor body portion, the sensor cover portion has an opening from which the wire is drawn. As a result of the sensor cover portion being provided with the removal preventing portion for the sensor body portion, even if the sensor body portion is detached from the wound portion, the sensor body portion is prevented from being removed from the opening from which the wire is drawn. Furthermore, as a result of the sensor cover portion covering part of the coupling surface, substantially all of the surfaces, except for the mounting surface and the portion from which the wire is drawn, are covered by the sensor cover portion, thus making it possible to further suppress a liquid coolant supplied to the wound portion from coming into contact with the sensor body portion.

As a configuration of the above-described reactor, a heat dissipation sheet or heat dissipation grease may further be provided between the wound portion and the sensor body portion.

As a result of the heat dissipation sheet or the heat dissipation grease being provided between the wound portion and the sensor body portion, it is easy to closely attach the sensor body portion to the wound portion.

As a configuration of the above-described reactor, the mounting surface may further be provided with leg portions that form a space between the sensor body portion and the wound portion.

As a result of the leg portions forming a space between the wound portion and the sensor body portion, a liquid coolant supplied to the wound portion can enter and fill up the space when the reactor is operated. The liquid coolant that has entered the space will remain filling up this space. The liquid coolant filling up the space will no longer have endothermic effect over time. As a result of filling up the space, the liquid coolant serves as a heat transfer member, and thus it is possible to measure more accurately the temperature of the wound portion (coil). According to the above-described configuration, since the heat transfer member can be formed between the wound portion and the sensor body portion when the reactor is operated, preparation and arrangement of a heat transfer member can be omitted at the time of manufacturing the reactor.

As a configuration of the above-described reactor, the mounting surface may include a flat portion.

If, for example, the entirety of the mounting surface, which is included in the outer periphery of the sensor body portion and is used for mounting to the wound portion, is flat, it is easy to closely attach the sensor body portion to the wound portion.

Hereinafter, embodiments of the present disclosure will be described in detail. Note that the present disclosure is not limited to these examples but is defined by the claims, and is intended to encompass all modifications in the scope of the claims and equivalent thereto. The same reference numerals in the drawings denote a constituent component with the same name.

Embodiment 1

A reactor 1 according to Embodiment 1 will be described with reference to FIGS. 1 to 4.

Reactor

Overall Configuration

The reactor 1 according to Embodiment 1 includes a coil 2 with wound portions 2c obtained by winding a winding wire, a magnetic core 3 that is arranged inside and outside the wound portions 2c and forms a closed magnetic circuit, and a sensor member 5 configured to measure the temperature of the coil 2. The sensor member 5 is provided with a rod-shaped sensor body portion 52 attached to the outer peripheral surface of a wound portion 2c, and wires 54 coupled to the sensor body portion 52. The reactor 1 of Embodiment 1 further includes an end-face interposed member 4 that is interposed between outer-side core portions 32 of the magnetic core 3 that are arranged outside the wound portions 2c, and end faces of the wound portions 2c.

The reactor 1 is used in a state in which a liquid coolant is supplied to the wound portions 2c as needed. The reactor 1 is arranged, for example, such that the axial directions of the wound portions 2c match a vertical direction, and is used in the state in which the liquid coolant is supplied to the wound portions 2c by being continuously sprayed from below the reactor 1. In this case, an installation target to which the reactor 1 is to be installed is oriented in the vertical direction, a surface of the reactor 1 that extend in the axial directions of the wound portions 2c serves as an installation surface, and this installation surface is oriented in the vertical direction. In FIGS. 1 to 4, a state is shown in which, for ease of illustration, the installation surface of the reactor 1 is oriented in a horizontal direction, and the following description will be given based on upper and lower in the drawings, unless otherwise noted.

The reactor 1 of Embodiment 1 has a feature that the wound portions 2c have an exposed region so that a liquid coolant comes into direct contact with the wound portions 2c. Furthermore, the reactor 1 of Embodiment 1 has a feature that, in order to prevent the liquid coolant from coming into contact with the sensor body portion 52, a sensor cover portion 6 is provided that covers the surfaces of the outer periphery of the sensor body portion 52, except for a mounting surface 521 for mounting to the wound portion 2c and a coupling surface 525 to which the wires 54 are coupled. As a result of the liquid coolant coming into direct contact with the wound portions 2c, the coil 2 is efficiently cooled, and as a result of the sensor cover portion 6 being provided, the sensor body portion 52 is suppressed from coming into direct contact with the liquid coolant and being cooled.

The following will describe in detail a configuration of the reactor 1.

Coil

Figure 2:
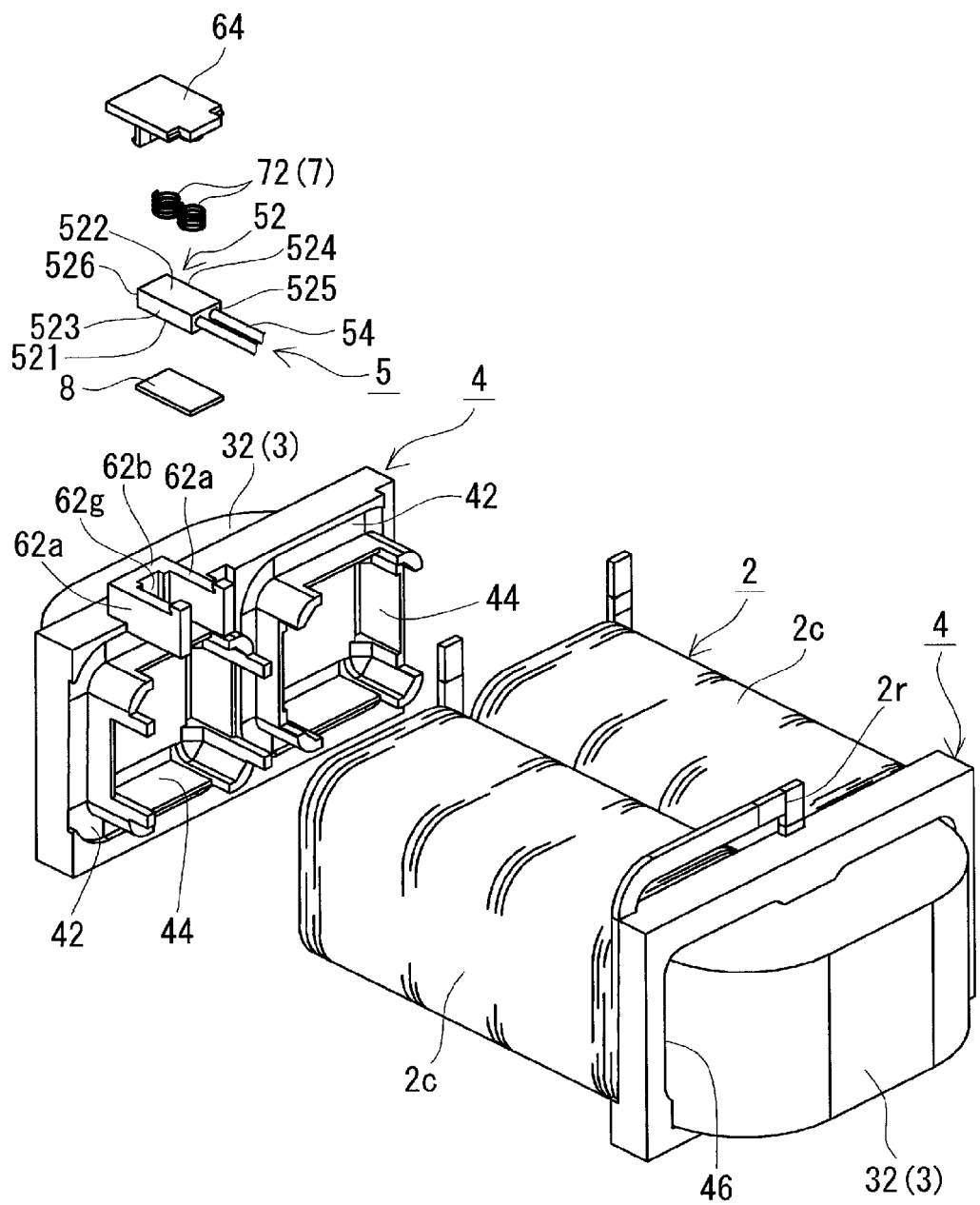
FIG. 2 is an exploded perspective view illustrating part of the reactor of Embodiment 1.

As shown in FIGS. 1 and 2, the coil 2 includes the pair of wound portions 2c obtained by winding a winding wire, and a joint portion 2r in which the ends, on one side, of the wound portions 2c are joined to each other. The wound portions 2c are formed tubularly by winding a winding wire in a spiral manner, and the two wound portions 2c are arranged laterally side by side (in parallel to each other) so that axial directions thereof are parallel to each other. Various types of welding, soldering, brazing, and the like can be used for the connection for the joint portion 2r. The ends, on the other side, of the two wound portions 2c are drawn from the wound portions 2c, and are provided with terminal fittings (not-shown), which are electrically connected to an external device (not-shown) such as a power supply that supplies power to the coil 2.

The wound portions 2c are constituted by a coated rectangular wire (so-called enamel wire) including a rectangular conductor made of copper or the like, and an insulating coating that coats the outer periphery of the conductor and is made of polyamide-imide or the like. In this example, both wound portions 2c are square tubular edgewise coils with rounded corners, and have the same shape, size, winding direction, and number of turns. The coil 2 can employ two well-known wound portions 2c of the same specification that are arranged laterally side by side. For example, the wound portions 2c may be formed by a single continuous winding wire, or may also be joined, using welding or the like, to each other at their ends. The specification of the winding wire or the wound portions 2c may be modified as appropriate, and the two wound portions 2c may also have different shapes, sizes, winding directions, and numbers of turns.

The wound portions 2c have an exposed region with which a liquid coolant comes into direct contact. In this context, the expression that the wound portions are "exposed" refers to the state in which the outer periphery of the wound portions 2c is not covered by a cover member such as resin, and the liquid coolant can come into direct contact with the wound portions 2c. In the present example, although the pair of wound portions 2c are arranged laterally side by side, the two wound portions 2c have a gap therebetween, and thus the liquid coolant that has entered this gap can come into direct contact with the wound portions 2c. As a result of the wound portions 2c being exposed, it is possible to efficiently cool the wound portions 2c using the liquid coolant when the reactor 1 is operated.

Magnetic Core

As shown in FIGS. 1 and 2, the magnetic core 3 includes a pair of outer-side core portions 32 arranged outside the wound portions 2c, and a pair of inner-side core portions (not-shown) arranged inside the wound portions 2c. The outer-side core portions 32 are columnar with a dome-shaped installation surface (lower surface in FIGS. 1 and 2) and a dome-shaped opposite surface (upper surface in FIGS. 1 and 2) that is opposite thereto. The inner-side core portions are columnar with their outer shape conforming to the inner circumferential shape of the wound portions 2c. The magnetic core 3 is ring-shaped such that the pair of outer-side core portions 32 are arranged with the pair of inner-side core portions, which are spaced apart from each other, interposed therebetween, and the end faces of the inner-side core portions and the inner end faces of the outer-side core portions 32 are in contact with each other. When the coil 2 is excited, a closed magnetic circuit is formed at the ring-shaped magnetic core 3.

The magnetic core 3 is mainly made of a soft magnetic material. Examples of the soft magnetic material include soft magnetic metal such as iron or an iron alloy (such as a Fe—Si alloy, a Fe—Si—Al alloy, or a Fe—Ni alloy). The magnetic core 3 may be soft magnetic powder made of a soft magnetic material, a compressed powder compact obtained by compaction molding of coated soft magnetic powder with an insulating coating or the like, a molded article of a complex material including soft magnetic powder and resin, or the like. The resin content of the molded article of the complex material may be from 10% by volume to 70% by volume inclusive, more preferably from 20% by volume to 50% by volume inclusive. The specification of the magnetic core 3 may be modified as appropriate.

In the present example, as shown in FIG. 1, resin molded portions 9 are provided that cover the outer periphery of the outer-side core portions 32, while conforming to the outer shape of the outer-side core portions 32. The resin molded portions 9 include mounting portions 92 for fixing the reactor 1 to an installation target (not-shown). The mounting portions 92 are provided at positions on two sides of each of the outer-side core portions 32, and thus the number of the mounting portions 92 is four in total. Metal collars 94 are embedded in the respective mounting portions 92, and the reactor 1 can be fixed to the installation target by inserting fastening members (not-shown) such as bolts into through-holes formed in the collars 94.

As resin of which the resin molded portion 9 is made, a thermoplastic resin may be used such as, for example, a polyphenylene sulfide (PPS) resin, a polytetrafluoroethylene (PTFE) resin, a liquid-crystal polymer (LCP), a polyamide (PA) resin such as nylon 6 or nylon 66, a polybutylene terephthalate (PBT) resin, or an acrylonitrile butadiene styrene (ABS) resin. Alternatively, a thermosetting resin may also be used such as an unsaturated polyester resin, an epoxy resin, a urethane resin, or a silicone resin. A ceramic filler such as alumina or silica may also be added to the above-described resin to improve the heat dissipation performance of the resin molded portion 9.

End-Face Interposed Member

As shown in FIG. 2, the end-face interposed members 4 are interposed between the outer-side core portions 32 and the end faces of the wound portions 2c, and are respectively arranged for both end-face sides of the wound portions 2c. One of the two end-face interposed members 4 is provided with part of the later-described sensor cover portion 6. The other end-face interposed member 4 has the same configuration as that of the one end-face interposed member 4, except for the absent of the sensor cover portion 6.

Each end-face interposed member 4 is provided with, on the wound portion 2c side, coil accommodating portions 42 for respectively accommodating ends of the wound portions 2c, and inner-core accommodating portions 44 for respectively accommodating ends of the pair of inner-side core portions. The coil accommodating portions 42 have a shape that conforms to the circumferential shape of the wound portions 2c and to the drawn-out ends of the winding wires. The inner-core accommodating portions 44 have a shape that conforms to the circumferential shape of the inner-side core portions, and more specifically a quadrangular shape with rounded corners conforming the contour shape of the end faces of the inner-side core portions. Each end-face interposed member 4 is also provided with, on the outer-side core portion 32 side, an outer-core accommodating portion 46 for accommodating an end of an outer-side core portion 32. The outer-core accommodating portion 46 has a shape that conforms to the circumferential shape of the outer-side core portion 32, and more specifically a rectangular shape conforming to the contour shape of the inner end face of the outer-side core portion 32. When the coil 2, the inner-side core portions, and the outer-side core portions 32 are attached together to the end-face interposed members 4, the end faces of the inner-side core portions and the inner end faces of the outer-side core portions 32 can be brought into contact with each other to constitute a ring, and the wound portions 2c can be arranged on the inner-side core portions. Furthermore, when the coil 2 is attached to the end-face interposed members 4, the sensor cover portion 6 can be arranged at a predetermined position on the wound portion 2c. The configuration of the sensor cover portion 6 will be described in detail later in the chapter about the sensor cover portion.

The end-face interposed members 4 are made of a material that ensures insulation between the outer-side core portions 32 and the wound portions 2c. Examples of the constituent material for the end-face interposed members 4 can include a PPS resin, a PTFE resin, a LCP, a PA resin such as nylon 6, a PBT resin, and an ABS resin. Alternatively, a thermosetting resin such as an unsaturated polyester resin, an epoxy resin, a urethane resin, and a silicone resin may also be used to make the end-face interposed members 4. A ceramic filler may also be added to the above-described resin to improve the heat dissipation performance of the end-face interposed members 4.

Sensor Member

As shown in FIGS. 1 to 4, the sensor member 5 is provided with a rod-shaped sensor body portion 52 attached to the exposed region of the wound portion 2c, and wires 54 coupled to the sensor body portion 52. The sensor body portion 52 includes a temperature sensor 52a, and a protection portion 52b that covers and protects the temperature sensor 52a (see FIG. 4). The wires 54 transmit an output (electric signal) indicating information (temperature) sensed by the temperature sensor 52a to an external device (not-shown) such as a control unit. A connector (not-shown) to which a wire of the external device is electrically connected is provided at ends of the wires 54.

The temperature sensor 52a is a sensor capable of measuring the temperature of the coil 2, and examples of the sensor include a heat sensitive element such as a thermistor, a thermocouple, or a pyroelectric element. In the present example, a thermistor is provided.

Figure 4:
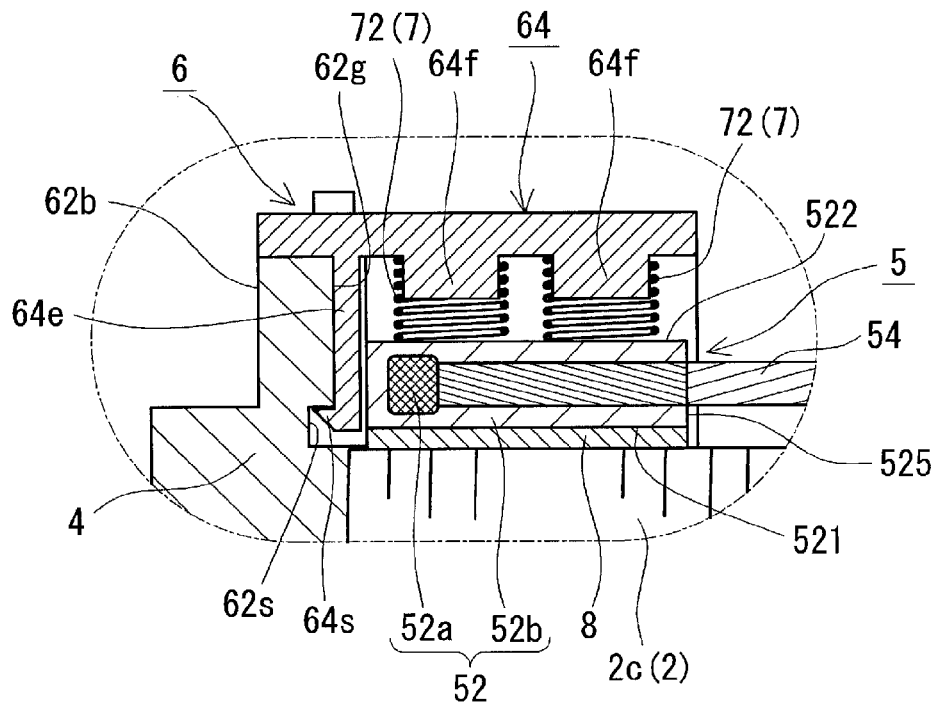
FIG. 4 is an enlarged cross-sectional view of the vicinity of the sensor member included in the reactor of Embodiment 1.

As shown in FIG. 4, the temperature sensor 52a is preferably provided in the vicinity of an end of the wound portion 2c. In a state of use in which the reactor 1 is arranged such that the axial directions of the wound portions 2c match the vertical direction and a liquid coolant is continuously sprayed from below the reactor 1, when the temperature sensor 52a is provided in the vicinity of the upper-side end of the wound portion 2c, the temperature sensor 52a can be arranged at a farthermost position from a supply source of the liquid coolant. Accordingly, it is possible to further suppress the liquid coolant from coming into contact with the temperature sensor 52a.

Suitable construction, shape, size, and the like of the protection portion 52b can be selected so that the temperature sensor 52a can be protected, and the temperature sensor 52a can reliably be attached closely to the outer peripheral surface of the wound portion 2c. In the present example, the protection portion 52b is columnar, and the sensor body portion 52 is arranged so that the longitudinal direction of the column matches the axial direction of the wound portion 2c. Because the protection portion 52b forms the outer shape of the sensor body portion 52, and the protection portion 52b is rectangular and columnar, the entire mounting surface 521 for mounting to the wound portion 2c is flat, and thus the sensor body portion 52 can easily be attached closely to the wound portion 2c having a flat outer peripheral surface. Furthermore, since the longitudinal direction of the protection portion 52b matches the axial direction of the wound portion 2c, the entire mounting surface 521 of the sensor body portion 52 can be brought into contact with the outer peripheral surface of the wound portion 2c using the flat portions thereof, so that it is easy to closely attach the sensor body portion 52 to the wound portion 2c. In this case, when the temperature sensor 52a is provided in the vicinity of the end of the wound portion 2c, the wires 54 will be drawn inward in the axial direction of the wound portion 2c (see FIG. 1). Note that, in FIGS. 1 and 2, for ease of understanding, the leading end portions of the wires 54 that extend from the sensor cover portion 6 are omitted. The direction in which the wires 54 are drawn can be selected suitably depending on the layout of the temperature sensor 52a.

A constituent material for the protection portion 52b may be resin such as a thermoplastic resin or a thermosetting resin. Examples of the thermoplastic resin include a PPS resin, a PTFE resin, LCP, a PA resin such as nylon 6, a PBT resin, and an ABS resin. Examples of the thermosetting resin include an unsaturated polyester resin, an epoxy resin, a urethane resin, and a silicone resin. These types of resin typically have a higher thermal conductivity than that of air. As a result of the protection portion 52b made of such a resin being interposed between the temperature sensor 52a and the coil 2, heat of the coil 2 can be better transmitted to the temperature sensor 52a via the protection portion 52b than in a case where there is air around the temperature sensor 52a. Furthermore, these types of resin are typically electrically insulating materials, and thus electrical insulation between the temperature sensor 52a and the coil 2 can be ensured. The protection portion 52b can be easily formed by using an appropriate molding method such as injection molding with the temperature sensor 52a used as a core.

As shown in FIG. 4, a heat dissipation member 8 is preferably interposed between the sensor body portion 52 and the wound portion 2c. A heat dissipation sheet or heat dissipation grease may be used as the heat dissipation member 8. The heat dissipation member 8 can fill up a gap created between the sensor body portion 52 and the wound portion 2c, and the sensor body portion 52 can be closely attached to the wound portion 2c, and can accurately measure the temperature of the coil 2. Examples of the heat dissipation sheet include a silicone gel sheet, and examples of the heat dissipation grease include silicone grease. If the heat dissipation member 8 has an adhesive layer on the surface thereof on the wound portion 2c side, the heat dissipation member 8 and the wound portion 2c can be fixed to each other while being closely attached to each other.

Alternatively, a space (not-shown) may also be provided, without the heat dissipation member 8 being interposed, between the sensor body portion 52 and the wound portion 2c. In this case, the mounting surface 521 of the sensor body portion 52 is provided with leg portions 52bq for forming a space between the sensor body portion 52 and the wound portion 2c (see FIG. 5, and the leg portions 52bq being described in detail in Embodiment 2). This space has a size sufficient to allow a liquid coolant to enter and fill up when the reactor 1 is operated. As will be described later, because most part of the coupling surface 525 to which the wires 54 are coupled, of the outer periphery of the sensor body portion 52, is exposed without being covered by the sensor cover portion 6, if a space is provided between the sensor body portion 52 and the wound portion 2c, the liquid coolant supplied to the wound portions 2c may enter the space when the reactor 1 is operated. The liquid coolant that has entered the space remains filling up this space, and will no longer have endothermic effect over time. The gap created between the sensor body portion 52 and the wound portion 2c can be filled with the liquid coolant filling up the space, and this liquid coolant serves as a heat transfer member, thus making it possible to measure the temperature of the wound portions 2c (coil 2) more accurately.

Sensor Cover Portion

Figure 3:
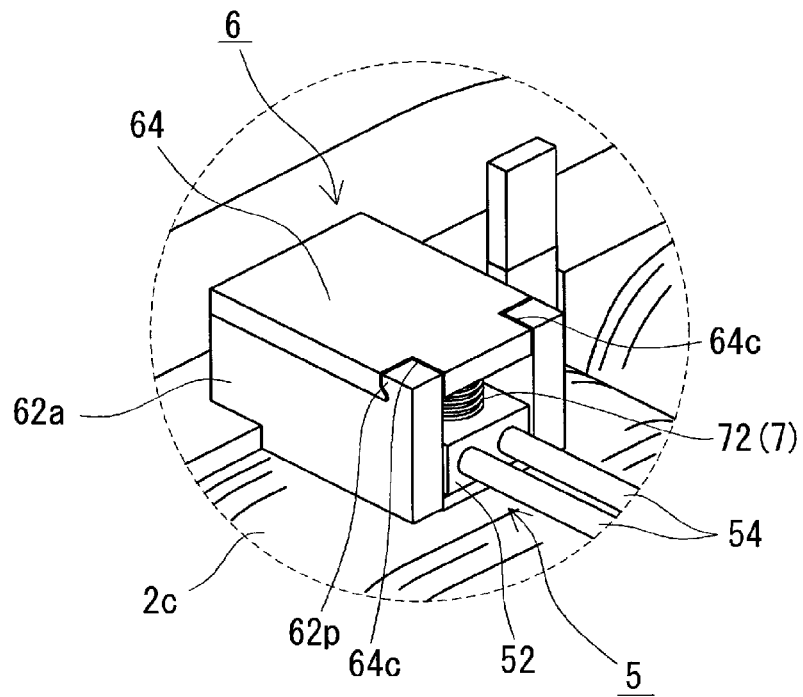
FIG. 3 is a perspective view schematically illustrating the vicinity of a sensor member included in the reactor of Embodiment 1.

The sensor cover portion 6 is a member that covers surfaces (an opposite surface 522, side surfaces 523 and 524, and a coupling opposite surface 526) of the outer periphery of the sensor body portion 52, except for the mounting surface 521 for mounting to the wound portion 2c and the coupling surface 525 to which the wires 54 are coupled. Hereinafter, of the outer periphery of the sensor body portion 52, a surface that is mounted to the wound portion 2c is referred to as the "mounting surface 521", a surface that is opposite to the mounting surface 521 is referred to as the "opposite surface 522", surfaces that intersect the mounting surface 521 and extend in the longitudinal direction of the sensor body portion 52 are referred to as the "side surfaces 523 and 524", a surface to which the wires 54 are coupled is referred to as the "coupling surface 525", and a surface that is opposite to the coupling surface 525 is referred to as the "coupling opposite surface 526". As shown in FIGS. 1 to 3, the sensor cover portion 6 is provided with wall portions 62a and 62b that cover, of the outer periphery of the sensor body portion 52, the intersecting surfaces (the side surfaces 523 and 524, and the coupling opposite surface 526) that extend in a direction in which they intersect the mounting surface 521 for mounting to the wound portion 2c, and a lid portion 64 that covers the opposite surface 522, which is opposite to the mounting surface 521 for mounting to the wound portion 2c.

The wall portions 62a that cover the side surfaces 523 and 524, and the wall portion 62b that covers the coupling opposite surface 526 are integrally molded as one piece, and are integrated with the end-face interposed member 4. Specifically, as shown in FIG. 2, the wall portions 62a and 62b are such that the wall portion 62b stands upward from an opposite surface (the upper surface in FIG. 2) of the end-face interposed member 4 that is opposite to an installation surface (the lower surface in FIG. 2) thereof, and the wall portions 62a extend from the wall portion 62b toward the wound portion 2c side. The wall portions 62a protrude from the end face, on the wound portion 2c side, of the end-face interposed member 4. The wall portions 62a protrude to such an extent that they can cover the side surfaces 523 and 524 of the sensor body portion 52 when the coil 2 is attached to the end-face interposed member 4. When the coil 2 is attached to the end-face interposed member 4, the wall portions 62a and 62b are arranged on the wound portion 2c, and an arrangement space for the sensor body portion 52 is formed with the wound portion 2c and the wall portions 62a and 62b.

The lid portion 64 that covers the opposite surface 522 is an independent member provided separately from the wall portions 62a and 62b. The wall portions 62a, 62b and the lid portion 64 are combined with each other using a snap-fit structure in which they are fitted to each other. After the sensor body portion 52 is arranged in the arrangement space for the sensor body portion 52 that is formed by the wound portion 2c and the wall portions 62a and 62b, the lid portion 64 is arranged so as to cover the opposite surface 522 of the sensor body portion 52.

As shown in FIG. 4, the snap-fit structure of the wall portions 62a, 62b and the lid portion 64 is constituted by an engagement groove 62s formed in the wall portion 62b, and an engagement claw 64s provided on the lid portion 64. The wall portion 62b has, on the inner face thereof, the engagement groove 62s for engaging with the engagement claw 64s, and a guide groove 62g that extends to the engagement groove 62s from the side on which the lid portion 64 is mounted. The guide groove 62g is a groove for guiding the engagement claw 64s to the engagement groove 62s, and has a shallower depth than the engagement groove 62s. The lid portion 64 has, on the inner face thereof, an extended portion 64e that is extended toward the wound portion 2c, and has, at the leading end of the extended portion 64e, the engagement claw 64s that protrudes toward the wall portion 62b. The engagement claw 64s is tapered from the leading end of the extended portion 64e in the protrusion direction.

Furthermore, as shown in FIG. 3, the wall portions 62a are provided with, at ends opposite to the wall portion 62b, protrusion portions 62p that protrude toward the lid portion 64. The protrusion portions 62p protrude by almost the same amount as the thickness of the lid portion 64. When viewed from the side (in the direction in which the wound portions 2c are parallel to each other), the protrusion portions 62p have the shape of a right-angle trapezoid with a long upper side, a short lower side, and an oblique side located on the wall portion 62b side (outer-side core portion 32 side). As shown in FIG. 3, the lid portion 64 is provided with cut-off portions 64c at positions corresponding to the protrusion portions 62p. The cut-off portions 64c each have an oblique face such that the lid portion 64 becomes thinner toward the wire 54 side. When the wall portions 62a and 62b and the lid portion 64 are assembled, the protrusion portions 62p of the wall portions 62a engage with the cut-off portions 64c of the lid portion 64, and the oblique faces of the cut-off portions 64c correspond to the oblique sides of the protrusion portions 62p, so that the wire drawing side of the lid portion 64 is fixed without being disengaged upward.

In the present example, as shown in FIG. 4, the lid portion 64 is provided with, on the inner face thereof, fixing portions 64f that protrude toward the wound portion 2c, and fix later-described elastic members 7 (coil springs 72). In the present example, the fixing portions 64f are circularly tubular. The fixing portions 64f suppress, by being inserted into the inner circumferences of the coil springs 72, displacement of the coil springs 72 in a direction that intersects the axial direction of the coil springs 72.

The wall portions 62a, 62b and the lid portion 64 can be made of the same constituent material as that of the end-face interposed members 4.

Elastic Member

The elastic members 7 can be interposed between the sensor body portion 52 and the lid portion 64. The elastic members 7 are provided between the sensor body portion 52 and the lid portion 64, and are compressed to press the sensor body portion 52 toward the wound portion 2c. For example, the coil springs 72 can be used as the elastic members 7. In the present example, two coil springs 72 are arranged in the axial direction of the sensor body portion 52. With the use of the two coil springs 72, a uniform pressing force is likely to be exerted on the sensor body portion 52 over the entire length, in the axial direction, of the sensor body portion 52. The number of coil spring 72 may also be one, and in this case, the coil spring 72 is preferably arranged in the central portion, in the axial direction, of the sensor body portion 52.

Reactor Manufacturing Method

The reactor 1 having the above-described configuration can be manufactured in a procedure in which, for example, an assembly of the coil 2, the magnetic core 3, and the end-face interposed members 4 is formed, then the sensor member 5 is arranged, and then the sensor body portion 52 of the sensor member 5 is covered.

Formation of Assembly

The coil 2, the magnetic core 3, and the end-face interposed members 4 are assembled. The wound portions 2c with the inner-side core portions arranged inside thereof, and the outer-side core portions 32 are attached to the end-face interposed members 4. At this time, by accommodating the ends of the wound portions 2c in the coil accommodating portions 42 of the end-face interposed members 4, accommodating the ends of the inner-side core portions in the inner-core accommodating portions 44, and accommodating the ends of the outer-side core portions 32 in the outer-core accommodating portions 46, the end faces of the inner-side core portions can be brought into contact with the inner end faces of the outer-side core portions 32 so that a ring is formed, and the wound portions 2c can be arranged on the inner-side core portions. Furthermore, the wall portions 62a and 62b of the sensor cover portion 6 are arranged on a wound portion 2c, and the wound portion 2c and the wall portions 62a and 62b form an arrangement space for the sensor body portion 52.

Arrangement of Sensor Member

The sensor member 5 is attached so that the sensor body portion 52 is arranged in the arrangement space formed by the wound portion 2c and the wall portions 62a and 62b. At this time, by placing the heat dissipation member 8 on the upper face of a wound portion 2c, and placing the sensor body portion 52 on the upper face of this heat dissipation member 8, the heat dissipation member 8 is interposed between the sensor body portion 52 and the wound portion 2c.

Covering of Sensor Body Portion

The lid portion 64 is attached to the wall portions 62a and 62b. At this time, by inserting the fixing portions 64f provided on the inner face of the lid portion 64 into the inner circumferences of the coil springs 72, the coil springs 72 are interposed between the sensor body portion 52 and the lid portion 64. The wall portions 62a, 62b and the lid portion 64 are assembled using the snap-fit structure. Specifically, first, the cut-off portions 64c of the lid portion 64 are fitted to the protrusion portions 62p of the wall portions 62a, and in this state, by moving the engagement claw 64s of the lid portion 64 along the guide groove 62g of the wall portion 62b, the lid portion 64 is pressed against the wall portion 62a, 62b side. When the engagement claw 64s is engaged with the engagement groove 62s of the wall portion 62b, the wall portions 62a, 62b and the lid portion 64 cover the entire surfaces of the outer periphery of the sensor body portion 52, except for the mounting surface 521 and the coupling surface 525. In the present example, since the coil springs 72 are interposed between the sensor body portion 52 and the lid portion 64, the sensor body portion 52 is pressed against the wound portion 2c side by the coil springs 72.

Effects

The reactor 1 according to Embodiment 1 is appropriately usable when, in a state of use, it is arranged such that the axial directions of the wound portions 2c match the vertical direction, and a liquid coolant is continuously sprayed from below the reactor 1. Since, in the above-described reactor 1, the wound portions 2c have an exposed region, the liquid coolant comes into direct contact with the wound portions 2c, and even if the coil 2 generates heat and the temperature thereof increases, the liquid coolant can efficiently reduce the increase in the temperature of the coil 2. In a state of use in which the reactor 1 is arranged such that the sensor member 5 is arranged on the upper side, in the axial direction, of the wound portions 2c, even if the liquid coolant comes into direct contact with the wound portions 2c, the temperature sensor 52a is unlikely to be affected by the liquid coolant, and can accurately measure the temperature of the wound portions 2c (coil 2). This is because, since the temperature sensor 52a is provided in the vicinity of an end of a wound portion 2c, and the sensor body portion 52 including the temperature sensor 52a is covered by the sensor cover portion 6, the liquid coolant sprayed upward from below the reactor 1 is unlikely to reach the position of the temperature sensor 52a, and even if this occurs, the liquid coolant is unlikely to come into contact with the sensor body portion 52 due to the sensor cover portion 6. Furthermore, since, in the installed state of the reactor 1, the opening of the sensor cover portion 6 from which the wires 54 are drawn is open downward, the liquid coolant sprayed upward from below is unlikely to enter the sensor cover portion 6, and even if this occurs, the liquid coolant will fall due to its own weight, and thus the sensor body portion 52 is substantially prevented from being directly cooled by the liquid coolant.

Furthermore, in the above-described reactor 1, the exposed region of the wound portion 2c and the sensor body portion 52 are in contact (areal contact) with each other in the flat regions, and thus it is easy to closely attach the sensor body portion 52 to the wound portion 2c, and it is also easy to accurately measure the temperature of the wound portions 2c (coil 2). Specifically, since the coil springs 72 are interposed between the sensor body portion 52 and the lid portion 64, and press the sensor body portion 52 against the wound portion 2c side, the sensor body portion 52 can be more closely attached to the wound portion 2c, and can accurately measure the temperature of the wound portions 2c (coil 2).

Moreover, the reactor 1 has superior assembly property because the above-described reactor 1 is such that the wall portions 62a and 62b, which are part of the sensor cover portion 6, are integrated with an end-face interposed member 4, and the lid portion 64, which is the remaining part of the sensor cover portion 6, is provided separately from the wall portions 62a and 62b. This is because, when the coil 2, the magnetic core 3, and the end-face interposed members 4 are put together into an assembly, an arrangement space for the sensor body portion 52 is formed by the wound portion 2c and the wall portions 62a and 62b, and after arranging the sensor body portion 52 in this arrangement space, the lid portion 64 can be combined therewith using the snap-fit structure.

Usage

The reactor 1 of Embodiment 1 is applicable as a constituent component of various converters or power conversion devices, examples of the converters including on-board converters (representative examples thereof include a DC/DC converter) installed in vehicles such as hybrid automobiles, plug-in hybrid automobiles, electric automobiles, and fuel-cell-powered automobiles, and converters installed in air conditioners.

Other Configurations

The reactor 1 of Embodiment 1 may also be provided with, instead of the temperature sensor, a sensor (not-shown) for measuring a physical amount of the reactor, such as a current sensor, a voltage sensor, or a magnetic flux sensor. In the case where any of these sensors is provided, the sensor can be covered in its outer periphery with the above-described sensor cover portion.

Embodiment 2

Figure 5:
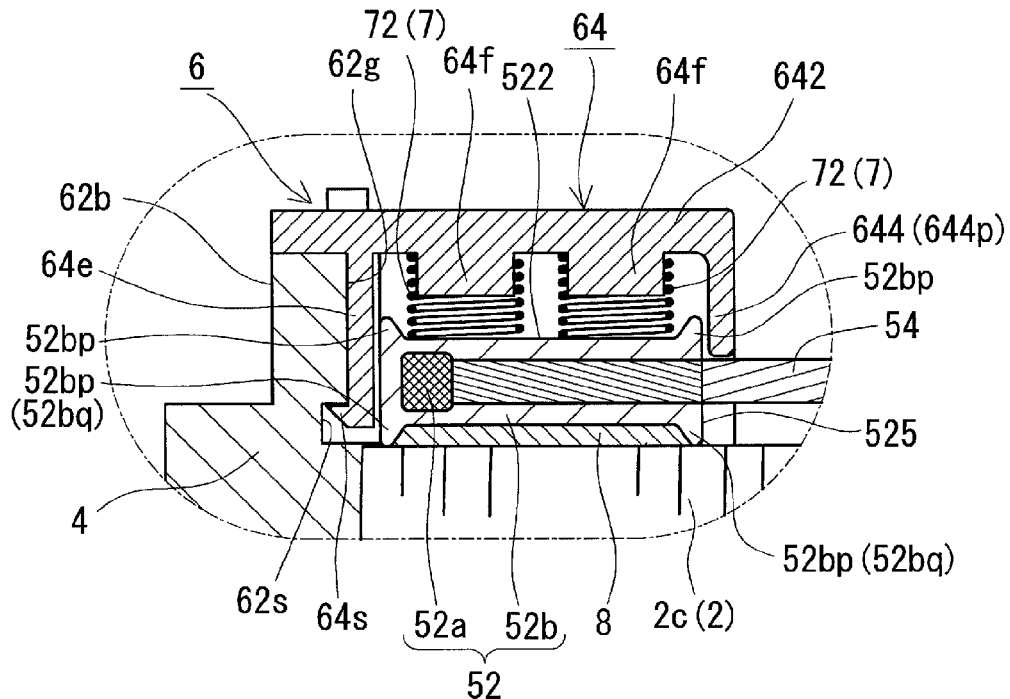
FIG. 5 is an enlarged cross-sectional view of the vicinity of a sensor member included in a reactor according to Embodiment 2.

Embodiment 2 will describe a reactor in which, as shown in FIG. 5, the sensor cover portion 6 covers the entire surfaces of the outer periphery of the sensor body portion 52, except for the mounting surface 521 (FIG. 2) and part of the coupling surface 525 (FIG. 2). Part of the coupling surface 525 refers to an opening required to draw the wires 54 outward. The basic configuration of the reactor of Embodiment 2 is the same as that of the reactor 1 of Embodiment 1, except for the main difference that the sensor cover portion 6 further covers another part of the coupling surface 525. FIG. 5 is only an enlarged cross-sectional view showing the vicinity of the sensor body portion 52 of the reactor.

The sensor cover portion 6 is provided with the wall portions 62a and 62b (see FIGS. 3 and 4 together) that are integrated with the end-face interposed member 4, and the lid portion 64 provided separately from the wall portions 62a and 62b. The configurations of the wall portions 62a and 62b are the same as those of the wall portions 62a and 62b of the Embodiment 1. The lid portion 64 of Embodiment 2 is provided with a ceiling portion 642 that covers the opposite surface 522 of the sensor body portion 52, and a wall portion 644 that is provided contiguous to the ceiling portion 642, and covers the coupling surface 525 except for that part thereof. As a result of the wall portion 644 being provided, the liquid coolant can be further suppressed from coming into contact with the sensor body portion 52. The configuration of the lid portion 64 of Embodiment 2 is the same as that of the lid portion 64 of Embodiment 1, except for the wall portion 644 being provided.

In the present example, the protection portion 52b of the sensor body portion 52 is provided with a projection 52bp at an edge of the coupling surface 525, the projection 52bp projecting in a direction that is orthogonal to the axial direction. The wall portion 644 of the lid portion 64 extends from the ceiling portion 642 to the position at which it overlaps the projection 52bp, when viewed in a direction that is orthogonal to the longitudinal direction of the sensor body portion 52. In other words, the wall portion 644 of the lid portion 64 functions as a removal preventing portion 644p for the sensor body portion 52 with respect to the projection 52bp of the protection portion 52b. Since the sensor cover portion 6 has an opening from which the wires 54 are drawn, by providing the removal preventing portion 644p for the sensor body portion 52, it is possible to prevent the sensor body portion 52 from being removed from the opening from which the wires 54 are drawn, even if the sensor body portion 52 is detached from the wound portion 2c.

The projection 52bp provided on the protection portion 52b is also provided on the wound portion 2c side. With this projection 52bp, a space is formed between the sensor body portion 52 and the wound portion 2c. In other words, the projections 52bp on the mounting surface 521 side of this sensor body portion 52 function as the leg portions 52bq for forming a space between the sensor body portion 52 and the wound portion 2c. In this space, the heat dissipation member 8 may also be arranged or the space may also be filled with a liquid coolant when the reactor 1 is operated. Note that the portions of the mounting surface 521, except for the leg portions 52bq, may be flat, as shown in FIG. 5.

Embodiment 3

Figure 6:
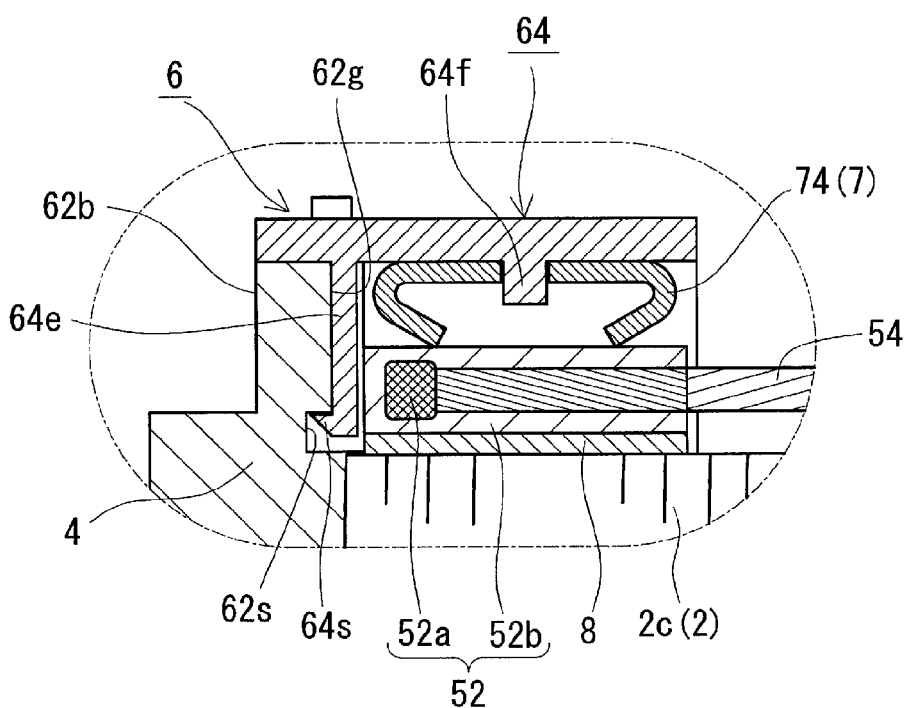
FIG. 6 is an enlarged cross-sectional view of the vicinity of a sensor member included in a reactor according to Embodiment 3.

Embodiment 3 will describe a reactor in which, as shown in FIG. 6, a flat spring 74 is used as the elastic member 7. The basic configuration of the reactor of Embodiment 3 is the same as that of the reactor of Embodiment 1, except for the difference that the flat spring 74 is used as the elastic member 7. FIG. 6 is only an enlarged cross-sectional view showing the vicinity of the sensor body portion 52 of the reactor.

The flat spring 74 is a lamellar flat spring with its flat surface being into contact with the lid portion 64, the flat spring being bent inward toward the sensor body portion 52 from two ends of the flat surface. One flat spring 74 is arranged in the central portion, in the axial direction, of the sensor body portion 52. The flat spring 74 has, in the central portion of the flat surface thereof, a through hole through which a fixing portion 64f provided on the inner face of the lid portion 64 is inserted. As a result of the fixing portion 64f being inserted through this through hole, displacement of the flat spring 74 can be suppressed.

Embodiment 4

Figure 7:
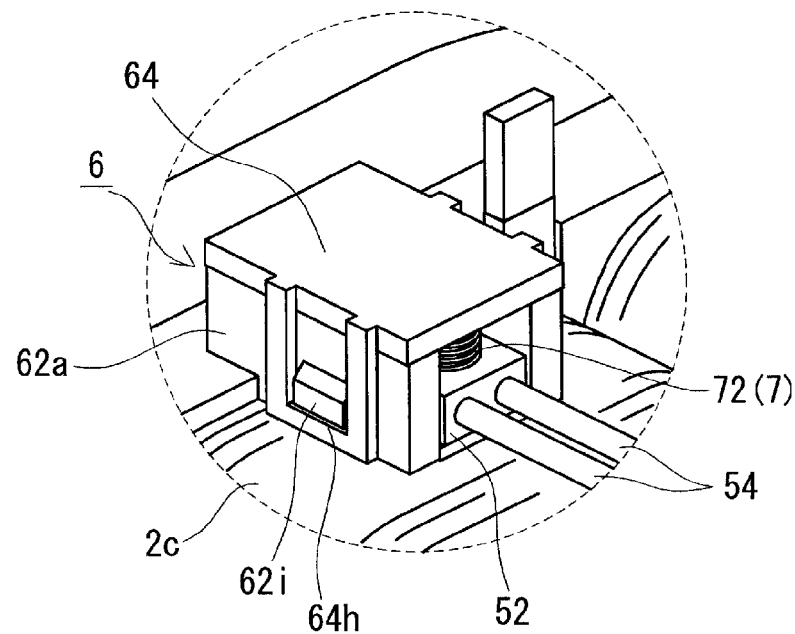
FIG. 7 is a perspective view schematically illustrating the vicinity of a sensor member included in a reactor according to Embodiment 4.
Figure 8:
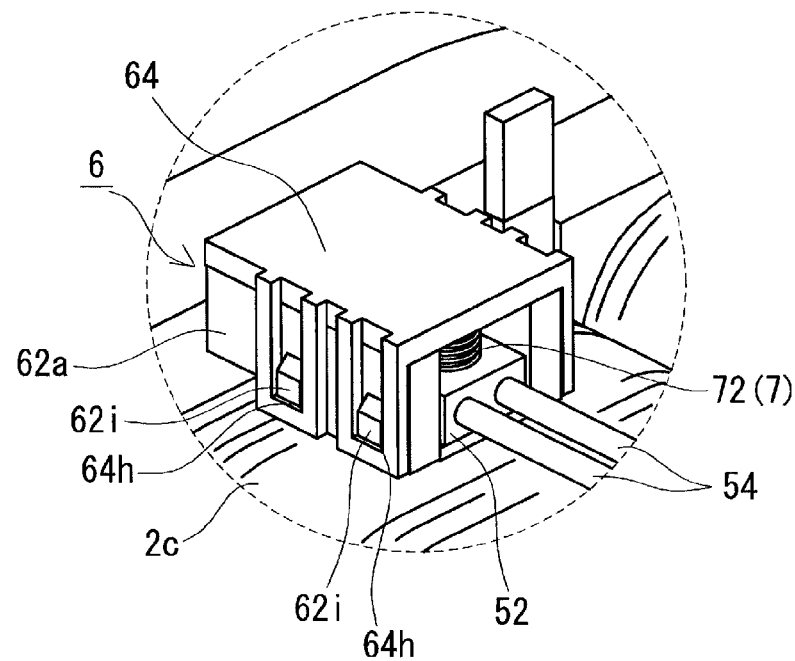
FIG. 8 is a perspective view schematically illustrating another aspect of a snap-fit structure of the reactor of Embodiment 4.

Embodiment 4 will describe a reactor in which, as shown in FIGS. 7 and 8, snap-fit structures for putting together the wall portions 62a, 62b and the lid portion 64 are provided outside the sensor cover portion 6. The basic configuration of the reactor of Embodiment 4 is the same as that of the reactor 1 of Embodiment 1, except for the main difference in the snap-fit structures. FIGS. 7 and 8 are only perspective views schematically showing the vicinity of the sensor body portion 52 of the reactor.

Each snap-fit structure for the wall portions 62a, 62b and the lid portion 64 is constituted by an engagement protrusion 62i provided on a wall portion 62a, and an engagement hole 64h formed in the lid portion 64. The engagement protrusion 62i protrudes from the outer peripheral surface of the wall portion 62a, and is a protrusion such that the protrusion amount becomes smaller toward the lid portion 64 from the sensor body portion 52 side. The engagement hole 64h is a U-shaped hole extending from the lid portion 64 toward the wound portion 2c. The wall portions 62a, 62b and the lid portion 64 can be combined with each other by pressing the lid portion 64 against the wall portions 62a, 62b until the engagement protrusions 62i engage into the engagement holes 64h. When the engagement protrusions 62i engage into the engagement holes 64h, the entire surfaces of the outer periphery of the sensor body portion 52, except for the mounting surface 521 and the coupling surface 525, are covered by the wall portions 62a, 62b and the lid portion 64.

One snap-fit structure (FIG. 7) for the wall portions 62a, 62b and the lid portion 64, or a plurality, namely, two snap-fit structures (FIG. 8) may be provided on each of the facing wall portions 62a. The two snap-fit structures provided on each of the facing wall portions 62a are arranged in parallel to each other in the axial direction of the coil 2. As a result of a plurality of snap-fit structures being provided on each of the facing wall portions 62a, even if any one of the snap-fit structures is broken, the remaining snap-fit structure can be used to combine the wall portions 62a, 62b with the lid portion 64. Of course, three or more snap-fit structures for the wall portions 62a, 62b and the lid portion 64 may also be provided on each of the facing wall portions 62a. As a result of the snap-fit structures being provided outside the sensor cover portion 6, only by pressing the lid portion 64 against the wall portions 62a and 62b, it is easy and simple to combine these portions together. Accordingly, the protrusion portions 62p that are formed on the wall portions 62a, and the cut-off portions 64c that are formed in the lid portion 64 (FIGS. 2 and 3) can be omitted.

The invention claimed is:

1. A reactor comprising:
a coil provided with a wound portion that is obtained by winding a winding wire, and has an exposed region with which a liquid coolant comes into direct contact;
a magnetic core that is arranged inside and outside the wound portion, and forms a closed magnetic circuit;
a sensor member configured to measure a temperature of the coil, the sensor member including a rod-shaped sensor body portion attached to the exposed region of the wound portion, and a wire coupled to the sensor body portion;
an end-face interposed member interposed between an outer-side core portion of the magnetic core that is arranged outside the wound portion, and an end face of the wound portion; and
a sensor cover portion that covers surfaces of an outer periphery of the sensor body portion, except for a mounting surface for mounting to the wound portion and at least part of a coupling surface to which the wire is coupled, the sensor cover portion includes a pair of wall portions and a lid portion removably attached to the pair of wall portions, the pair of wall portions being spaced apart from each other, the pair of wall portions being integrated with the end-face interposed member and extending outwardly from the end-faced interposed member so as to be disposed above the wound portion and place the sensor body in thermal contact with the wound portion, the lid portion configured to rest on a top surface of the pair of wall portions so as to cover the sensor body portion.

2. The reactor according to claim 1,
wherein the pair of wall portions cover a respective intersecting surface of the sensor body portion, the intersecting surface extends in a direction that intersects the mounting surface.

3. The reactor according to claim 2, further comprising:
an elastic member that is interposed between the lid portion and the sensor body portion, and presses the sensor body portion toward the wound portion.

4. The reactor according to claim 3,
wherein the elastic member is a coil spring or a flat spring.

5. The reactor according to claim 2, wherein the wall portion and the lid portion have a snap-fit structure with which the wall portion and the lid portion are fitted to each other.

6. The reactor according to claim 1, wherein the sensor cover portion includes a removal preventing portion that covers a region of the coupling surface, except for a portion from which the wire is drawn, the removal preventing portion preventing the sensor body portion from being removed.

7. The reactor according to claim 1, further comprising:
a heat dissipation sheet or heat dissipation grease that is provided between the wound portion and the sensor body portion.

8. The reactor according to claim 1, wherein the mounting surface is provided with leg portions that form a space between the sensor body portion and the wound portion.

9. The reactor according to claim 1, wherein the mounting surface includes a flat portion.

* * * * *